(12) United States Patent
Thione et al.

(10) Patent No.: US 7,984,032 B2
(45) Date of Patent: Jul. 19, 2011

(54) ITERATORS FOR APPLYING TERM OCCURRENCE-LEVEL CONSTRAINTS IN NATURAL LANGUAGE SEARCHING

(75) Inventors: Giovanni Lorenzo Thione, San Francisco, CA (US); Barney Pell, San Francisco, CA (US); Chad Walters, San Francisco, CA (US); Richard Crouch, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 12/201,047

(22) Filed: Aug. 29, 2008

(65) Prior Publication Data

US 2009/0070298 A1    Mar. 12, 2009

Related U.S. Application Data

(60) Provisional application No. 60/969,406, filed on Aug. 31, 2007, provisional application No. 60/969,486, filed on Aug. 31, 2007.

(51) Int. Cl.
*G06F 17/30* (2006.01)
(52) U.S. Cl. ........................................................ 707/705
(58) Field of Classification Search ........................ 707/3
See application file for complete search history.

(56) References Cited

U.S. PATENT DOCUMENTS

| | | | |
|---|---|---|---|
| 5,386,556 A * | 1/1995 | Hedin et al. ............................ | 1/1 |
| 5,721,902 A * | 2/1998 | Schultz .................................... | 1/1 |
| 5,933,822 A | 8/1999 | Braden-Harder et al. | |
| 5,974,412 A * | 10/1999 | Hazlehurst et al. ................... | 1/1 |
| 6,185,592 B1 | 2/2001 | Boguraev et al. | |
| 6,243,670 B1 | 6/2001 | Bessho et al. | |
| 6,366,908 B1 | 4/2002 | Chong et al. | |
| 6,654,740 B2 | 11/2003 | Tokuda et al. | |
| 6,675,159 B1 | 1/2004 | Klein et al. | |
| 6,766,316 B2 | 7/2004 | Wang et al. | |
| 6,766,320 B1 | 7/2004 | Wang et al. | |
| 6,795,820 B2 | 9/2004 | Barnett | |
| 6,947,923 B2 | 9/2005 | Cha et al. | |
| 7,027,974 B1 * | 4/2006 | Busch et al. ........................ | 704/4 |
| 7,146,536 B2 * | 12/2006 | Bingham et al. ................. | 714/26 |
| 7,225,121 B2 | 5/2007 | Maxwell et al. | |
| 7,319,951 B2 | 1/2008 | Rising et al. | |
| 7,389,224 B1 | 6/2008 | Elworthy | |
| 7,401,077 B2 | 7/2008 | Bobrow et al. | |

(Continued)

OTHER PUBLICATIONS

International Search Report dated Mar. 26, 2009 in International Application No. PCT/US2008/074935.

(Continued)

*Primary Examiner* — Sheree Brown
(74) *Attorney, Agent, or Firm* — Hope Baldauff Hartman, LLC (57) ABSTRACT

Tools and techniques are described that relate to iterators for applying term occurrence-level constraints in natural language searching. These tools may receive a natural language input query, and define term occurrence-level constraints applicable to the input query. The methods may also identify facts requested in the input query, and may instantiate an iterator to traverse a fact index to identify candidate facts responsive to the input query. This iterator may traverse through at least a portion of the fact index. The methods may receive candidate facts from this iterator, with these candidate facts including terms, referred to as term-level occurrences. The methods may apply the term occurrence-level constraints to the term-level occurrences. The methods may select the candidate fact for inclusion in search results for the input query, based at least in part on applying the term occurrence-level constraint.

20 Claims, 5 Drawing Sheets

U.S. PATENT DOCUMENTS

| | | | |
|---|---|---|---|
| 7,403,938 B2 | 7/2008 | Harrison et al. | |
| 7,620,542 B2* | 11/2009 | Sheu et al. | 704/9 |
| 7,739,104 B2* | 6/2010 | Berkan et al. | 704/9 |
| 7,765,097 B1* | 7/2010 | Yu et al. | 704/9 |
| 7,831,545 B1* | 11/2010 | Betz | 707/603 |
| 2005/0071150 A1 | 3/2005 | Nasypny | |
| 2006/0047632 A1 | 3/2006 | Zhang | |
| 2006/0184517 A1 | 8/2006 | Anderson | |
| 2006/0293879 A1* | 12/2006 | Zhao et al. | 704/9 |
| 2007/0073533 A1 | 3/2007 | Thione et al. | |
| 2007/0150800 A1* | 6/2007 | Betz et al. | 715/500 |
| 2007/0198481 A1* | 8/2007 | Hogue et al. | 707/3 |
| 2007/0198503 A1* | 8/2007 | Hogue et al. | 707/5 |

OTHER PUBLICATIONS

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu.edu/viewdoc/download;jsessionid=F70461C9F31A4EB405543CE688CCBF3D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http://delivery.acm.org/10.1145/220000/215345/p112-chien.pdf?key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", Application No. 60969406, Filing Date Aug. 31, 2007.

Walters, et al., "Flexible Ranking infrastructure for query execution", U.S. Appl. No. 60/969,410, filed Aug. 31, 2007.

Walters, et al., "Checkpointing of composable lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for information retrieval", U.S. Appl. No. 60/969,453, filed Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.

Thione, et al., "Semantically-based highlighting of search results", U.S. Appl. No. 60/969,478, filed Aug. 31, 2007.

Salvetti, et al., "Integration of coreference resolution in an ambiguity-sensitive natural language processing pipleline for a search platform", U.S. Appl. No. 60/969,483, filed Aug. 31, 2007.

Thione, et al.,"Fact-based indexing for natural language search", U.S. Appl. No. 60/969,486, filed Aug. 31, 2007.

Thione, et al., "Attribute-value mapping to map structural information about entities to ontologies", U.S. Appl. No. 60/969,488, filed Aug. 31, 2007.

Thione, et al., "Indexing and ranking role hierarchies search index", U.S. Appl. No. 60/969,490, filed Aug. 31, 2007.

Thione, et al., "Efficient posting layout for retrieval of terms in dominance hierarchies", U.S. Appl. No. 60/969,495, filed Aug. 31, 2007.

Salvetti, et al., "A system for browsing knowledge on the basis of semantic relations", U.S. Appl. No. 60/971,061, filed Sep. 10, 2007.

U.S. Official Action dated Jan. 3, 2011 in U.S. Appl. No. 12/201,596.

International Search Report dated Apr. 29, 2009 in International Application PCT/US2008/74981.

Jun, et al., "Keyfact-Based Information Retrieval System", Tae Jon, Korea, downloaded Mar. 18, 2011 from http://www.dl.slis.tsukuba.ac.jp/ISDL97/proceedings/miseon/miseon.html, 6 pages.

Tablan, et al., "A Natural Language Query Interface to Structured Information", downloaded Mar. 18, 2011 from http://www.eswc2008.org/final-pdfs-for-web-site/onl-2.pdf.

* cited by examiner

ITERATORS FOR APPLYING TERM OCCURRENCE-LEVEL CONSTRAINTS IN NATURAL LANGUAGE SEARCHING

CROSS-REFERENCE TO PRIORITY APPLICATIONS

This application claims the benefit of the filing date of: U.S. Provisional Application Ser. No. 60/969,406, filed on 31 Aug. 2007, entitled "Applying Term Occurrence Constraints in Natural Language Search"; and U.S. Provisional Application Ser. No. 60/969,486, filed on 31 Aug. 2007 entitled "Fact-Based Indexing For Natural Language Search"; to the fullest extent permitted under 35 U.S.C. §119(e). This application also incorporates the contents of these Provisional Applications by this reference, as if those contents were included verbatim herein.

BACKGROUND

Typical keyword searching techniques may provide search capabilities at the document level, as well as at the position or location level within documents. At the document level, search indexes for keyword searching may provide some type of payload information about the document. At the position or location level, the search indexes may provide limited information about the particular location within the document. For example, the search indexes may indicate that a given word occurs at a given position or location within the document.

SUMMARY

Tools and techniques are described that relate to iterators for applying term occurrence-level constraints in natural language searching. These tools may receive a natural language input query, and define term occurrence-level constraints applicable to the input query. The methods may also identify facts requested in the input query, and may instantiate an iterator to traverse a fact index to identify candidate facts responsive to the input query. This iterator may traverse through at least a portion of the fact index. The methods may receive candidate facts from this iterator, with these candidate facts including terms, referred to as term-level occurrences. The methods may apply the term occurrence-level constraints to the term-level occurrences. The methods may select the candidate fact for inclusion in search results for the input query, based at least in part on applying the term occurrence-level constraint.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies relating to iterators for applying term occurrence-level constraints in natural language searching. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques relating to iterators for applying term occurrence-level constraints in natural language searching will be described.

Figure 1:
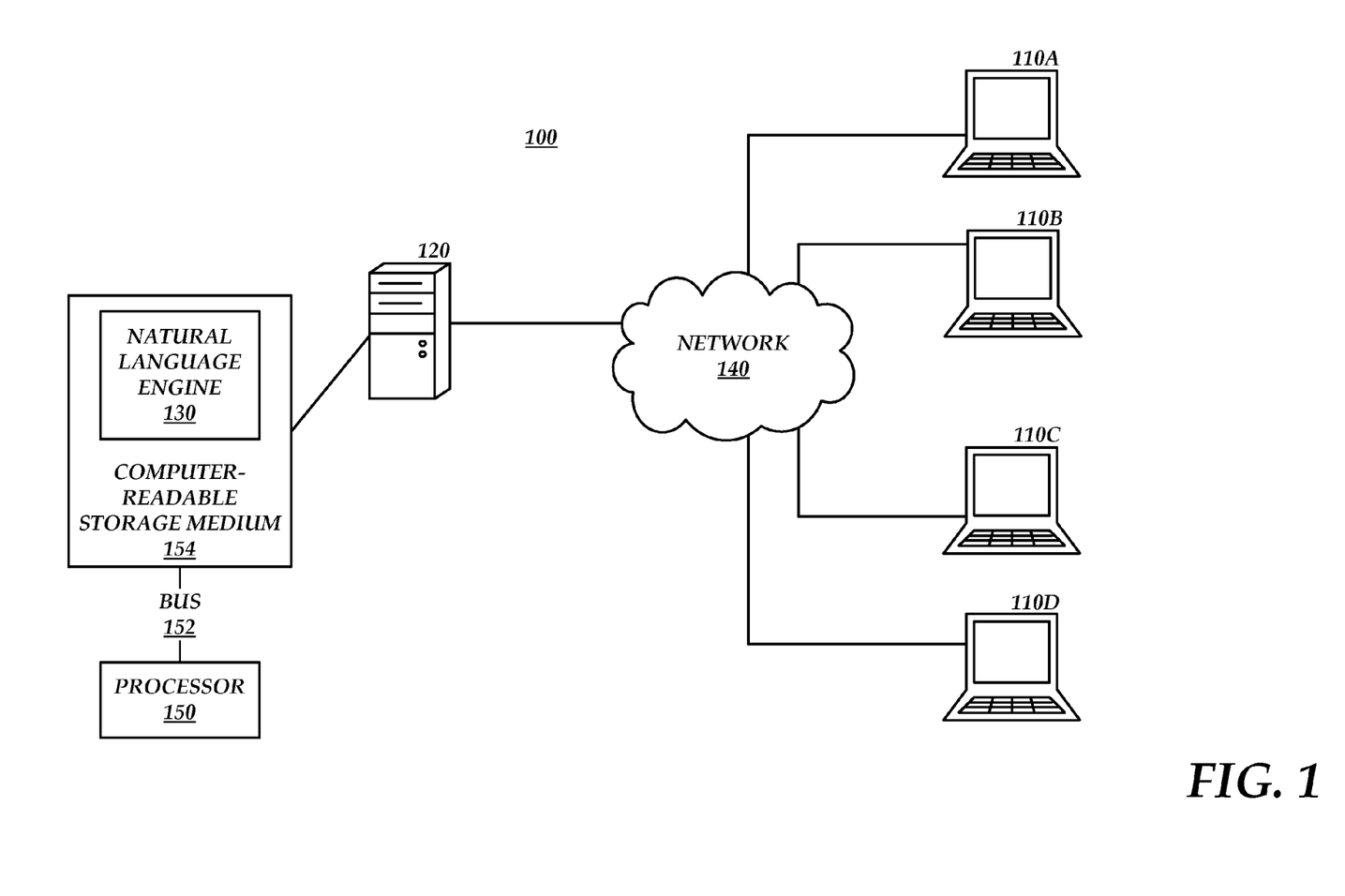
FIG. 1 is a block diagram illustrating overall systems or operating environments for checkpointing iterators during search.

FIG. 1 is a block diagram illustrating overall systems or operating environments relating to iterators for applying term occurrence-level constraints in natural language searching. Turning now to FIG. 1 in more detail, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that, in some implementations, the functionality of the server 120 may be distributed over any number of multiple servers 120. Such multiple servers 120 may be collocated, geographically distributed across a network 140, or any combination thereof. In other implementations, a single server 120 may operate as a desktop search appliance that processes information stored locally on that single server (e.g., on a hard disk device or other mass storage located within that server).

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology and links of the network may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Turning to the server 120 in more detail, these servers may include one or more processors 150, which may have a particular type or architecture, chosen as appropriate for particular implementations. The processors 150 may couple to one or more bus systems 152 chosen for compatibility with the processors 150.

The server 120 may also include one or more instances of computer-readable storage media 154, which couple to the bus systems 152. The bus systems may enable the processors 150 to read code and/or data to and/or from the computer-readable storage media 152. The media 152 may represent storage elements implemented using any suitable technology, including but not limited to semiconductors, magnetic materials, optics, or the like. The media 152 may include memory components, whether classified as RAM, ROM, flash, or other types, and may also represent hard disk drives.

The storage media 152 may include one or more modules of software instructions that, when loaded into the processor 150 and executed, cause the server systems 120 to perform various tools and techniques relating to iterators for applying term occurrence-level constraints in natural language searching. Examples of these modules may include the natural language engine 130, along with other software components as well.

Figure 2:
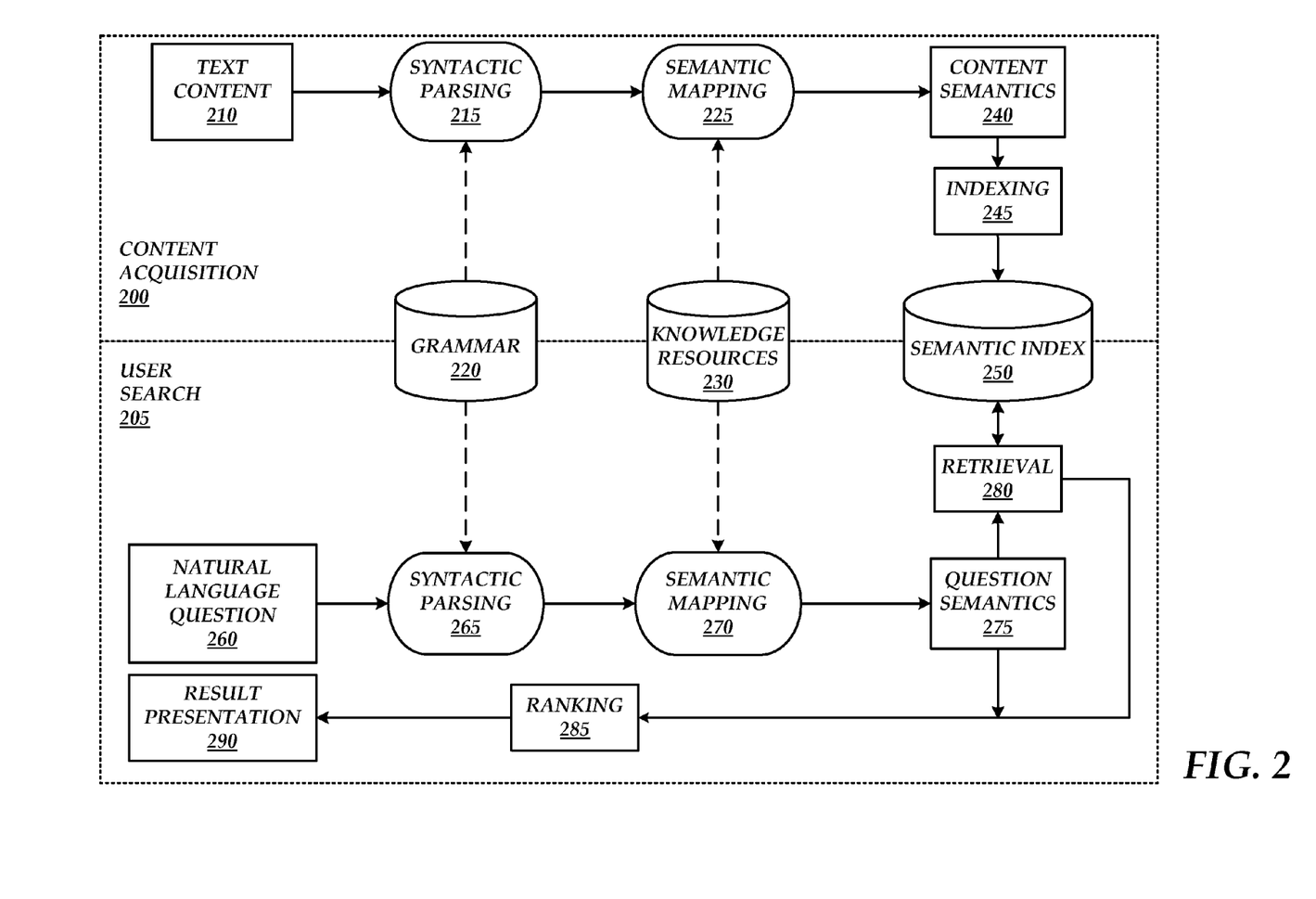
FIG. 2 is a block diagram illustrating processes or functions that a natural language engine may perform to checkpointing iterators during search.

FIG. 2 illustrates processes or functions that a natural language engine (e.g., 130 in FIG. 1) may perform relating to iterators for applying term occurrence-level constraints in natural language searching. Referring now to FIG. 2 in more detail, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system, such as the Xerox Linguistic Environment (XLE), provided here only as a general example, but not to limit possible implementations of this description. The parser 215 can convert sentences to representations that make explicit the syntactic relations among words. The parser 215 can apply a grammar 220 associated with the specific language in use. For example, the parser 215 can apply a grammar 220 for English. The grammar 220 may be formalized, for example, as a lexical functional grammar (LFG) or other suitable parsing mechanism. The grammar 220 can specify possible ways for constructing meaningful sentences in a given language.

The parser 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

The parser 215 can apply the grammar 220 to the text content 210 to determine syntactic structures. In the case of parsing with an LFG, these syntactic structures may include constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing process 215, information can be extracted from the syntactic structures and combined with information about the meanings of the words in the sentence. A semantic map or semantic representation of a sentence can be provided as content semantics 240. Semantic mapping 225 can augment the syntactic relationships provided by the parser 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by a parser 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of retrieval 280 from the semantic index 250 along with the question semantics 275 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result of presentation 290.

Figure 3:
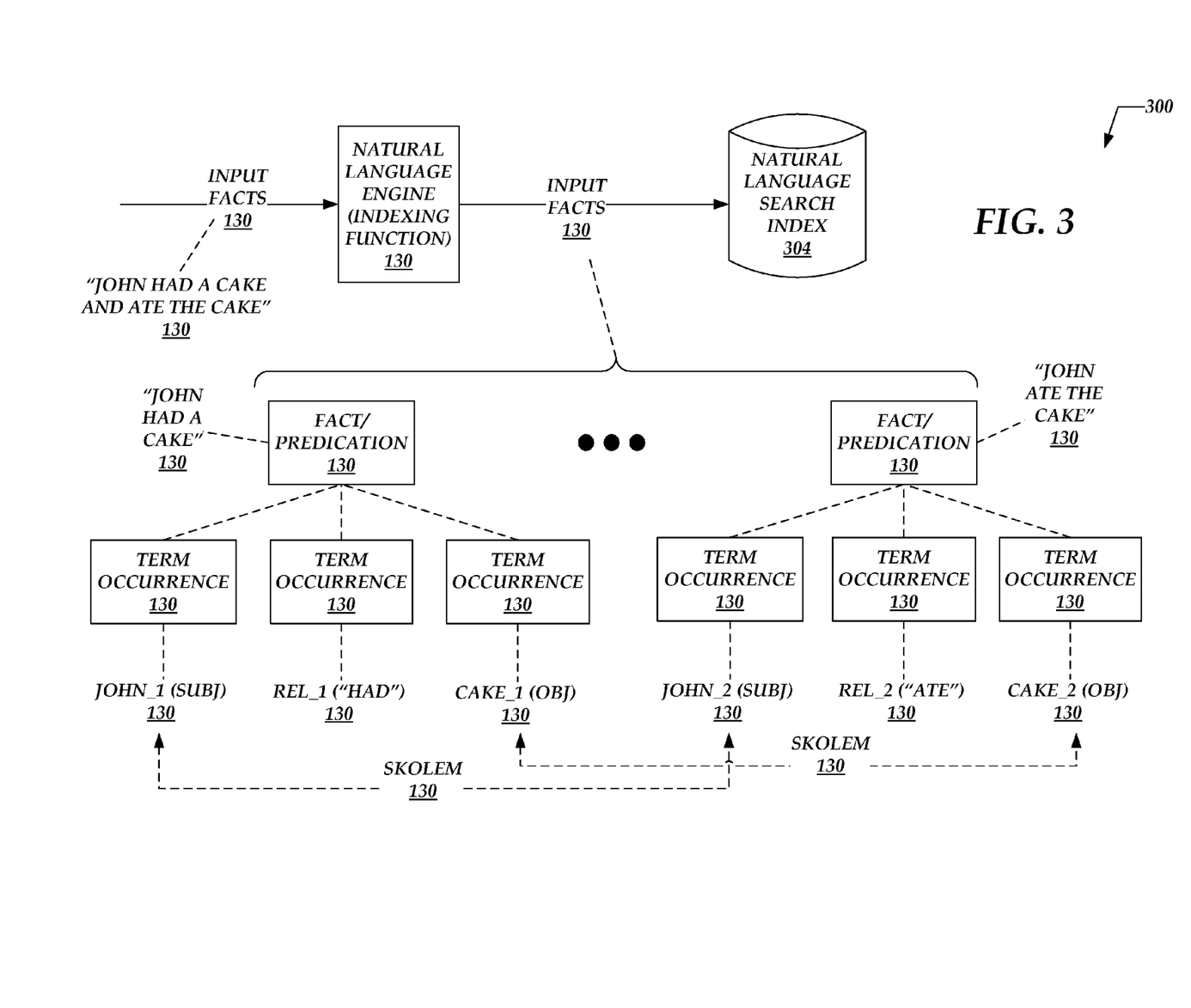
FIG. 3 is a combined block and flow diagram illustrating components and data flows related to iterators for applying term occurrence-level constraints in natural language searching.

FIG. 3 illustrates components and data flows, denoted generally at 300, related to iterators for applying term occurrence-level constraints in natural language searching. For ease of description, but not to limit possible implementations, the components and data flows 300 are described in connection with the natural language engine 130 described above in FIG. 1.

In general, the natural language engine 130 may provide an indexing function, such that the natural language engine receives a set of input facts 302. More specifically, the natural language engine 130 may store these input facts into a natural language search index 304, thereby facilitating subsequent natural language searches that are run against these facts. For example, one of these input facts 302 may include the sentence "John had a cake and ate the cake", as denoted generally at 306.

For indexing purposes, the natural language engine 130 may analyze these input facts 302 into any number of constituent facts or predications, denoted generally at 308. Returning to the example sentence introduced previously, the natural language engine 130 may analyze the sentence "John had a cake and ate the cake" as containing two facts or predications. The input facts 308 may include a first fact or predication 310 indicating that "John had a cake", as denoted at 312. The input facts 308 may also include a second fact or predication 314 indicating that "John ate the cake", as denoted at 316. Thus, the example sentence "John had a cake and ate the cake" may be deconstructed and analyzed as containing two facts: one fact revolving around John's possession of the cake, and a second fact revolving around John eating the same cake.

Turning to the first fact or predication 310 in more detail, the natural language engine 130 may represent this fact in the search index 304 by further deconstructing the fact 310 into any number of term occurrences. In the example shown in FIG. 3, the fact 310 may be represented by three term occurrences 318a, 318b, and 318c (collectively, term occurrences 318). The term occurrence 318a may represent the subject noun "John" in the example fact "John had a cake", as represented generally at 320a. The term occurrence 318b may represent the verb "had" as a relationship between the subject "John" and the object "cake", as represented generally at 320b. Finally, the term occurrence 318c may represent the object noun "cake", as represented generally at 320c.

Turning to the other fact or predication 314 in more detail, the natural language engine 130 may represent this fact in the search index by further deconstructing the fact 314 into any number of term occurrences. In the example shown in FIG. 3, the fact 314 may be represented by three term occurrences 322a, 322b, and 322c (collectively, term occurrences 322). The term occurrence 322a may represent the subject noun "John" in the example fact "John ate the cake", as represented generally at 324a. the term occurrence 322b may represent the verb "ate" as a relationship between the subject "John" and the object "cake", as represented generally at 324b. Finally, the term occurrence 320 to see may represent the object noun "cake", as represented generally at 324c.

In representing the different facts 310 and 314, the natural language engine 130 may co-reference different term occurrences appearing within these different facts. For example, in the two sample facts "John had a cake" and "John ate the cake", "John" is the semantic subject in both facts, and the "cake" is the semantic object in both facts. However, the term "John" may be labeled somewhat differently in the two occurrences 318a and 322a, even though these two terms refer to the same entity. For example, in the term occurrence 318a, the term "John" may be labeled as "John_1", while in the term occurrence 322a, the term "John" may be labeled as "John_2". Other example facts may refer to the entity "John" using the pronoun "he". In other example facts, the subject "John" may be understood, but not explicitly recited in the facts.

Similar considerations may apply to the entity "cake", which appears as the semantic object in both of the example facts 312 and 316. Thus, the term occurrence 318c may refer to the cake entity as "cake_1", while the term occurrence 322c may refer to the cake entity as "cake_2".

In these scenarios involving entities such as "John" and "cake", the term occurrences 318 and 322 may include payloads that perform several functions. For example, these payloads may include unique identifiers indicating that the labels "John_1" and "John_2" are co-references for the same entity "John", who is acting in the role of semantic subject in the two facts 312 and 316. Similarly, other unique identifiers may indicate that the labels "cake_1" and "cake_2" are co-references for the same entity "cake", acting in the role of semantic object in these same two facts 312 and 316.

Without limiting possible implementations, this description refers to these unique identifiers as skolems, with FIG. 3 providing examples of skolems at 326a and 326b. The skolem 326a indicates that the term occurrences 320a and 324a involve the same entity "John", and the skolem 326b indicates that the term occurrences 318c and 322c involve the same entity "cake".

The payloads associated with the term occurrences 318 and 322 may include, in addition to the skolems described above, other features. For example, some sentences may include ambiguous facts or predications, and the natural language engine 130 may encode and index different interpretations of these ambiguous facts. Term occurrences 318 and 322 may represent these different interpretations. In such scenarios, the term occurrences may be associated with payloads, which include labels that indicate which interpretation of an ambiguous sentence or fact is being encoded.

As detailed further throughout this description, particular facts may be true only in certain contexts, and the facts may be stored or labeled as associated with these particular contexts. Skolems representing these facts may also be associated with these contexts. In addition, constraints provided by this description may apply as fact-level constraints or term-level constraints, and operations may apply these constraints at the fact-level or the term-level. Although this description refers to these constraints as term occurrence-level constraints, only for ease of reference, synonymous terms may also include "identifier constraints." Examples of fact-level constraints may include constraints indicating that two or more given results are in the same fact. Examples of term-level constraints may include constraints indicating that two or more occurrences are represented by the same object. Other types of constraints may indicate that two or more facts have intersecting context labels.

Having described the indexing scheme and search index in FIG. 3, the discussion now turns to a description of iterators and related search-time processing. This description is now provided with FIG. 4.

Figure 4:
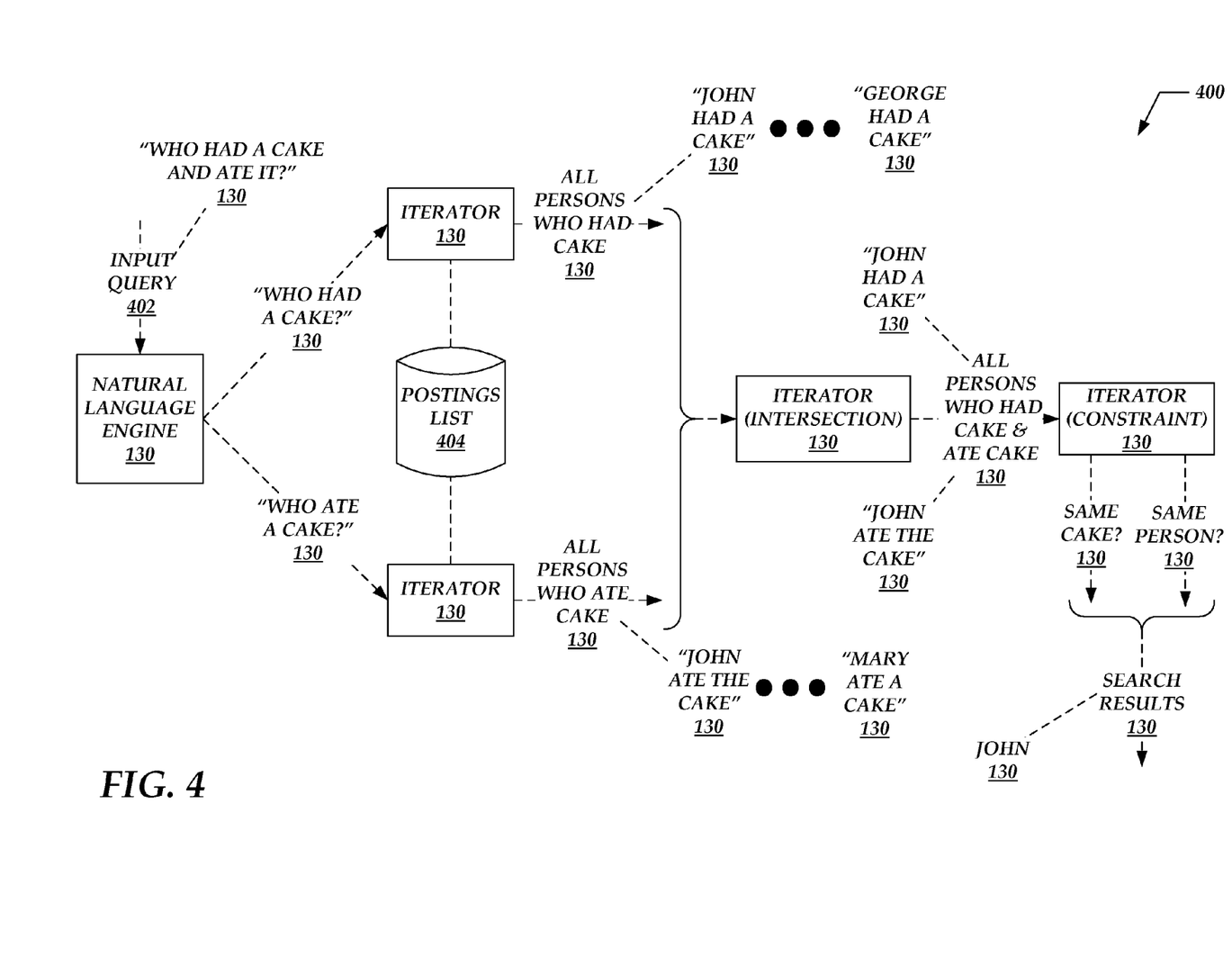
FIG. 4 is a combined block and flow diagram illustrating components and data flows that the natural language engine may perform at search-time, to respond to input queries.

FIG. 4 illustrates components and data flows, denoted generally at 400, that the natural language engine may perform at search-time, to respond to input queries. FIG. 4 carries forward the natural language engine 130, and denotes an example input query at 402. Given an example input query "who had a cake and ate it?", as represented at 404, the natural language engine 130 may decompose this input query for further processing. For example, the natural language engine 130 may recognize that responding to the input query "who had a cake and ate it?" involves answering the following questions:

1. Which persons had a cake?
2. Which persons ate a cake?
3. Of the persons identified in questions (1) and (2), which persons both had a cake and ate a cake?
4. Of the cakes identified in questions (1) and (2), which cakes were had and eaten by the same persons?

As shown in FIG. 4, the natural language engine 130 may decompose the input query 402 into one or more factual sub-queries, with two examples provided at 406a and 406b (collectively, sub-queries 406). For example, the sub-query 406a may represent the sub-query "who had a cake?", and the sub-query 406b to represent the sub-query "who ate a cake?"

The natural language engine 130 may instantiate a respective iterator for the different sub-queries 406, and may task these iterators with traversing the search index 304 (also referred to as a postings list or stream) to gather candidate facts responsive to these sub-queries. In the example shown in FIG. 4, an iterator 408a may traverse the search index 304 to gather candidate facts responsive to the sub-query "who had a cake?", and an iterator 408b may traverse the search index 304 to gather candidate facts responsive to the sub-query "who ate a cake?"

Turning to the iterator 408a in more detail, this iterator may be a software process that is assigned the sub-query "who had a cake?". Referring briefly back to FIG. 3, particularly the term occurrences 318 and 322, the iterator 408a may search for candidate facts 310 or 314 that respond to the sub-query "who had a cake?". More specifically, the iterator 408a may analyze the sub-query "who had a cake?", and recognize that the entity "cake" serves as a semantic object in the sub-query. The iterator 408a may also recognize that the semantic object "cake" is related to unknown semantic subjects by the verb relation "had".

In this example, the iterator 408a may search for all term occurrences 318 and 322 having the entity "cake" as a semantic object, and having the verb relation "had". In turn, the iterator 408a may return the facts or predications 310 and 314 that correspond to those term occurrences that meet these filtering criteria. These returned facts or predications 310 and 314 are referred to herein as candidate facts, with those candidate facts returned by the iterator 408a denoted at 410a.

Continuing the ongoing example from above, the candidate facts 410a may indicate all persons who had cake (represented collectively at 412a), as indexed into the search index 304. More specifically, these candidate facts 410a may include individual facts or predications 414a (e.g., "John had a cake"), 414b (e.g., "George had a cake"), and so on. In this example, the candidate fact 414a may correspond to the input fact 306 discussed above in FIG. 3.

The natural language engine 130 may also instantiate the iterator 408b, and task this iterator with the sub-query 406b "who ate a cake?". Similarly to the iterator 408a, the iterator 408b may traverse the search index 304, and generate candidate facts 410b responsive to the sub query 406b. In this example, the candidate facts 410b may include representations of all persons who ate cake, as represented collectively at 412b. More specifically, these candidate facts 410b may include individual facts or predications 414c (e.g., "John ate the cake"), 414d (e.g., "Mary ate a cake"), and so on. In this example, the candidate fact 414c may correspond to the input fact 306 discussed above in FIG. 3.

The natural language engine 130 may also instantiate one or more upper-level iterators 416, which receives the candidate facts 410a and 410b (collectively, candidate facts 410) from the lower-level iterators 408a and 408b. In turn, the upper-level iterator 416 may perform a preliminary operation or filtering on the candidate facts 410. In the ongoing example, the natural language engine 130 may recognize that the input query 404 may be analyzed by intersecting the candidate facts 410a with the candidate facts 410b, while also projecting these facts onto identifiers of documents that contain the facts. Afterwards, the results of the projected intersection may be mapped back onto a set of pairs of facts (viewed as sets of term occurrences) from 410a and 410b, respectively, such that both facts occur in the same document. Accordingly, the natural language engine 130 may configure the iterator 416 to perform a Boolean AND operation on the candidate facts 410a and 410b. In providing this example, however, it is noted that the iterator 416 may perform any number of different Boolean, logical, or set operations on the candidate facts 410.

Turning to the upper-level iterator 416 in more detail, this iterator may AND the candidate facts 410a and 410b together, resulting in an intersection result set 418. Continuing the ongoing example, this result set 418 may include facts representing all persons who had cake (as pointed-to by the iterator 408a) and ate cake (as pointed-to by the iterator 408b). More specifically, the result set 418 may include the fact "John had a cake", carried forward at 312, and the fact "John ate the cake", carried forward at 316.

The iterator 416 may be generalized beyond the illustrative example provided in this description. Considering the example query "who had a cake or pie, and ate it too?", the natural language engine 130 may instantiate multiple iterators 416, with one iterator 416 performing a union between candidate facts indicating that particular persons had a cake or a pie, and other iterator 416 performing a union between candidate facts indicating that particular persons ate a cake or a pie. Other iterators 416 may receive the results sets that are output from these union iterators, and intersect these results sets with one another, to identify a set of candidate facts indicating which persons possibly had a cake or a pie, and also ate the same cake or pie.

In this example, the iterator 416 may filter-out some of the candidate facts 410. More specifically, the iterator 416 may filter-out those candidate facts 410a that do not also appear in the candidate facts 410b, and vice versa. Although the iterator 416 may filter-out or exclude some of the candidate facts 410, those candidate facts 410 that are included in the result set 418 may or may not be responsive to the input query 402. For example, the input query may specify additional constraints, beyond the operation performed by the iterator 416. Therefore, the candidate facts included in the result set 418 may or may not satisfy these additional constraints.

Referring to the ongoing example, involving the query "who had a cake and ate it?", this query may constrain the search results, such that the same person both have a given cake and eat the given cake. Put differently, the same person is to be involved in having the cake and eating the cake, and the same cake is to be had and eaten by the same person.

In other examples, these constraints may specify semantic constraints over the output. For example, constraints may specify that only facts having a positive polarity may be considered and included in the search results, as distinguished from facts having a negative polarity. In other words, these constraints may specify facts that set forth information positively, rather than negatively.

As other examples of semantic constraints, some facts may employ reflexive pronoun constructions, such that the subject and object of a given relation have the same skolem identifier. In cases where input queries relate to such reflexive pronoun constructions, the iterators may apply constraints specifying that the subject and object of relations within candidate or nominated facts be the same.

To handle such additional constraints, denoted generally at 420, the natural language engine 130 may instantiate one or more upper-level iterators 422. These upper-level iterators 422 may receive representations of the constraints 420, and apply them to the result set 418. More specifically, the upper-level iterators 422 may apply the constraints 420 to the result set 418 on a term-wise basis, or at the occurrence level.

To illustrate example processing of the upper-level iterators 422, the discussion continues the ongoing example involving the query "who had a cake and ate it?". In this example, the constraints 420 may specify that the same cake (e.g., 424) and the same persons (e.g., 426) be involved in the facts included in the result set 418. However, referring briefly back to FIG. 3, at the level of the facts or predications 310 and 314 (or, more specifically, 312 and 316), it may be problematic to evaluate the constraints 420. For example, referring to the example facts 312 and 314 (respectively, "John had a cake" and "John ate the cake"), it may be unclear at the fact level whether the entities "John" involved in these two facts are the same person. at the fact level, it may also be unclear whether the entity "cake" involved in these two facts are the same cake.

At the term occurrence level (e.g., 318 and 322), however, payloads associated with the term occurrences may enable the iterator 422 to evaluate the constraints 420. For example, these payloads may include unique identifiers (e.g., skolems 326a and 326b) that correlate different term occurrences. For example, the skolem 326a may correlate the term occurrences 318a and 322a, indicating that the same entity "John" both had a cake, and also ate a cake. In addition, the skolem 326b may correlate the term occurrences 318c and 322c, indicating that the same entity "cake" was had by "John," and also eaten by "John".

Generalizing from this example, the iterator 422 may evaluate the constraints 420 at the term or occurrence level. In this manner, the iterator 422 may select those facts included in the result set 418 that satisfy any applicable constraints 420, and generate these facts as search results 428. Continuing the ongoing example, applying the constraints 420 (e.g., the more specific constraints 424 and 426) to the result set 418 indicates that at least the entity "John" satisfies these constraints, and is responsive to the input query 402. Accordingly, the search results 428 may include at least a representation of "John", as denoted at 430.

In general, the upper-level iterators 416 and 422 may be referred to as composite iterators, while the lower-level iterators 408*a* and 408*b* may be referred to as constituent iterators. The composite iterators may apply different types of term constraints to candidate facts in multiple different ways, as illustrated in the following non-limiting examples.

Single Term Scenarios

In some scenarios, composite iterators may apply constraints that check a predicate, or a Boolean combination of predicates, on occurrence information associated with a single term. Constraints of this type may be handled directly by advancing the constituent iterators to the location of the next valid term, and testing the predicate (or predicate combination) on that term's occurrence information. In turn, the composite iterator may determine whether the term's occurrence information should be allowed through (i.e., the term's predicate satisfies the constraint), or whether the term's occurrence information should be filtered-out (i.e., the term's predicate does not satisfy the constraint). If the predicate is being checked against a union composite, the occurrence information for all of its valid constituents may be checked, and the composite iterator may pass the predicate if any of the occurrences satisfy the predicate.

Multiple Term Scenarios

In some scenarios, composite iterators may apply constraints that check predicates on, relations between, or Boolean combinations of multiple terms in the same fact. The composite iterators may apply these constraints by advancing the constituent iterators, including any intersection iterators that validate particular facts. In turn, the composite iterators may check the predicates on or relations between the occurrence information accessed through the references to the underlying constituent terms. In general, relations between a union composite iterator and another iterator may be handled readily by the constraint iterator described next.

Terms Occurring in Different Facts

In some scenarios, composite iterators may apply constraints that check relations between, or combinations of predicates on, terms that occur in different facts. In such scenarios, the composite iterators applying the constraints may perform operations that identify tuples containing matches from each of the different facts. In some implementations, but not necessarily all, the composite iterators may compute these constraints using techniques similar to a join in a relational database. For example, illustrative but non-limiting implementations may use a hash-join to collect matching tuples. This may involve non-lazy iteration over the constituent iterators, to collect the set of matching tuples, and then applying the constraints to the collected tuples. To maintain composability with the other iterators, the tuples may be flattened, for example by extracting unique elements from the tuples in sorted order. In implementations particularly concerned with efficiency, these join-like operations may be specifically restricted to the fact-space covered by a given individual document.

Constraints Formed from Complex Combinations of the Above Types

In general, composite iterators may be assembled, by indexing and matching the various example iterators described above, to apply constraints of arbitrary complexity. In addition, these composite iterators may apply additional predicates on top of the join-like mechanism described in the previous paragraph.

Having described the search-time components and flows with FIG. 4, the discussion now turns to a description of search-time processes. This description is provided with FIG. 5.

Figure 5:
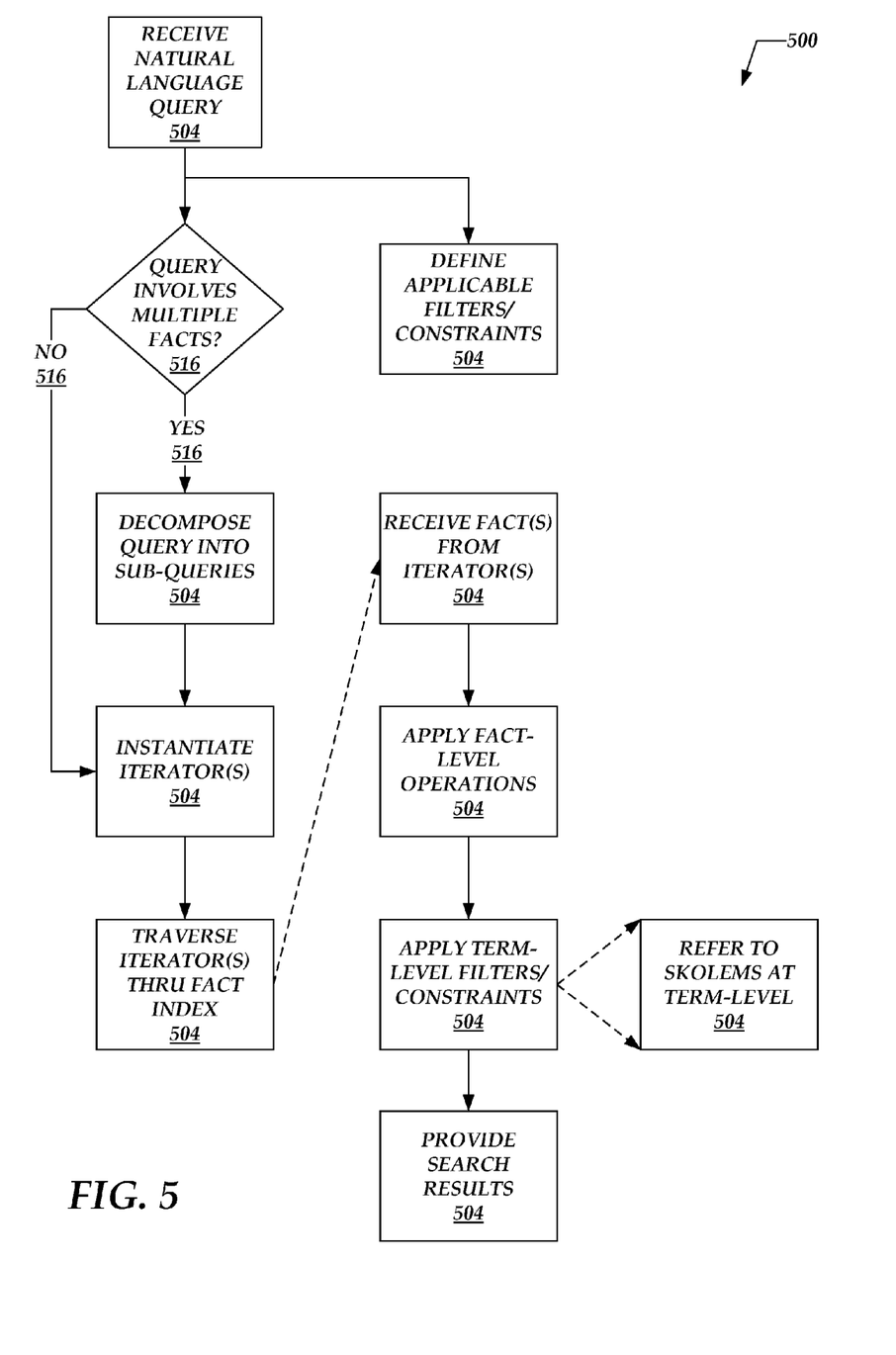
FIG. 5 is a flow diagram illustrating processes for applying term occurrence-level constraints in natural language searching.

FIG. 5 illustrates search-time process flows, denoted generally at 500, suitable for iterators for applying term occurrence-level constraints in natural language searching. For convenience of description, but not to limit possible implementations, the process flows 500 are described in connection with the natural language engine 130. However, it is noted that these process flows 500 may be implemented with other components, without departing from the scope and spirit of the present description.

Turning to the process flows 500 in more detail, block 502 represents receiving an input natural language query. FIG. 4 provides an example of such an input query at 402.

Decision block 504 represents determining whether the input query received in block 502 requests multiple facts. FIG. 4 was described in connection with the example input query "who had a cake and ate it?". In this example, block 504 may determine that this input query includes two facts (i.e., "who had a cake", and "who ate a cake"). However, other queries may involve one fact, while other queries may involve two or more facts.

From decision block 504, if the input query involves multiple facts, the process flows 500 may take Yes branch 506 to block 508, which represents decomposing the query into respective sub-queries. These sub-queries may correspond respectively to the multiple facts identified in block 504, and the sub-queries may be tailored to gather these multiple facts. FIG. 4 provides examples of these sub-queries at 406*a* and 406*b*.

Returning to decision block 504, if a given input query involves only one fact, the process flows 500 may take No branch 510 to block 512, which represents instantiating one or more iterators to traverse postings lists, search indexes, or the like. If the process flows 500 reach block 512 directly from decision block 504, then block 512 may include instantiating one iterator for the input query. However, if the process flows 500 reach block 512 through block 508, then block 512 may include instantiating a plurality of iterators, with different iterators assigned respectively to the different sub-queries.

In parallel with at least decision block 504, block 516 may include analyzing the input query to define any term occurrence-level constraints applicable to the input query. FIG. 4 illustrates examples of these constraints at 420, 424, and 426. Block 516 may also include defining any suitable filtering operations for performing the input query.

Block 512 may include instantiating one or more iterators to perform the filtering operations and to apply the term occurrence-level constraints, as defined by block 516. FIG. 4 provides examples of constituent iterators 408 for traversing the search index 304, a filtering iterator 416 that receives the outputs of the constituent iterators 408, and a constraint iterator 422 and applies the constraints 420 to the outputs of the filtering iterator 416.

Block 514 represents traversing the constituent iterators (e.g., 408 in FIG. 4) instantiated in block 512 through at least part of a search index (e.g., 304 in FIGS. 3 and 4). In turn, block 516 represents receiving candidate facts (e.g., 410 in FIG. 4) from these constituent iterators.

Block 518 represents applying operations at the fact level to the candidate facts received in block 516. In different possible scenarios, block 518 may include applying Boolean, logical, or set operations to the candidate facts received from constituent iterators.

Block 520 represents applying term occurrence-level constraints to the candidate facts received in block 516. For example, block 520 may include referring to skolems or other unique identifiers defined at the term level, as represented in block 522. FIG. 4 provides examples of these constraints at 420, 424, and 426.

Block 524 represents selecting search results, based a least in part on applying the term occurrence-level constraints in block 522. FIG. 4 provides an example search results at 428.

CONCLUSION

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium having computer-executable instructions stored thereon which, when executed by a computer system, cause the computer system to perform a method comprising:
    receiving at least one natural language input query;
    defining at least one term occurrence-level constraint applicable to the input query;
    identifying at least one fact requested in the input query;
    instantiating at least one iterator to traverse at least one fact index to identify at least one candidate fact that is responsive to the input query;
    traversing the iterator through at least a portion of the fact index;
    receiving at least one candidate fact from the iterator, wherein the candidate fact includes at least one term occurrence;
    applying the term occurrence-level constraint to the term occurrence; and
    selecting the candidate fact for inclusion in search results for the input query, based at least in part on applying the term occurrence-level constraint to the term occurrence.

2. The storage medium of claim 1, further comprising instructions for defining at least a further term occurrence-level constraints applicable to the input query.

3. The storage medium of claim 2, further comprising instructions for applying the further term occurrence-level constraint to at least the term occurrence.

4. The storage medium of claim 3, wherein the instructions for selecting the candidate fact include instructions for selecting the candidate fact based at least in part on applying at least the further term occurrence-level constraint to the term occurrence.

5. The storage medium of claim 1, further comprising instructions for identifying at least a further fact requested in the input query.

6. The storage medium of claim 5, further comprising instructions for instantiating at least a further iterator to locate at least one candidate corresponding to the further fact, in response to the input query.

7. The storage medium of claim 6, further comprising instructions for receiving at least one further candidate fact from the further iterator.

8. The storage medium of claim 7, further comprising instructions for applying at least one fact-level operation to the candidate fact and to at least the further candidate fact.

9. The storage medium of claim 8, wherein the instructions for applying at least one fact-level operation include instructions for performing a Boolean operation involving the candidate fact and at least the further candidate fact.

10. The storage medium of claim 1, further comprising instructions for instantiating at least a further iterator to perform at least one fact-level operation on the candidate fact and at least a second candidate fact, wherein the further iterator is for communicating with the iterator.

11. The storage medium of claim 1, further comprising instructions for instantiating at least a further iterator to apply the term occurrence-level constraint to the term occurrence, wherein the further iterator is for communicating with the iterator.

12. At least one computer-readable storage medium having computer-executable instructions stored thereon which, when executed by a computer system, cause the computer system to perform a method comprising:
    receiving at least one natural language input query;
    defining a plurality of term occurrence-level constraints applicable to the input query;
    decomposing the input query into a plurality of sub-queries, wherein a first sub-query relates to a first fact requested in the input query, and wherein at least a second sub-query relates to a second fact requested in the input query;
    instantiating a first iterator to identify at least a first candidate fact that is responsive to the input query and that relates to the first fact;
    instantiating at least a second iterator to identify at least a first candidate fact that is responsive to the input query and that relates to the second fact;
    traversing the first and second iterators through at least a portion of a fact index;
    receiving the first candidate fact from the first iterator, wherein the first candidate fact includes at least a first term occurrence;
    receiving the second candidate fact from the second iterator, wherein the second candidate fact includes at least a second term occurrence;
    performing at least one fact-level operation on at least the first and second candidate facts; and
    selecting search results for the input query, based at least in part on performing the fact-level operation on the candidate facts.

13. The storage medium of claim 12, further comprising instructions for applying the term occurrence-level constraints to the first and second term-level occurrences, further comprising instructions for selecting search results for the input query, based at least in part on applying the term occurrence-level constraints to the term occurrences.

14. The storage medium of claim 12, further comprising instructions for instantiating at least a third iterator to perform the at least one fact-level operation on at least the first and second candidate facts, wherein the third iterator is for communicating with the first and second iterators.

15. The storage medium of claim 14, wherein the instructions for instantiating at least a third iterator include instructions for instantiating an iterator for performing a Boolean operation on the first and second candidate facts.

16. The storage medium of claim 14, wherein the instructions for instantiating at least a third iterator include instructions for instantiating an iterator for performing a union or intersection operation on the first and second candidate facts.

17. The storage medium of claim 14, further comprising instructions for instantiating at least a fourth iterator to apply the term occurrence-level constraints to the first and second term occurrences, wherein the fourth iterator is for communicating with the third iterator.

18. At least one computer-readable storage medium having computer-executable instructions stored thereon which, when executed by a computer system, cause the computer system to perform a method comprising:
   receiving at least one natural language input query;
   defining a plurality of term occurrence-level constraints applicable to the input query;
   decomposing the input query into a plurality of sub-queries, wherein a first sub-query relates to a first fact requested in the input query, and wherein at least a second sub-query relates to a second fact requested in the input query;
   instantiating a first iterator to identify at least a first candidate fact that is responsive to the input query and that relates to the first fact;
   instantiating at least a second iterator to identify at least a first candidate fact that is responsive to the input query and that relates to the second fact;
   traversing the first and second iterators through at least a portion of a fact index;
   receiving the first candidate fact from the first iterator, wherein the first candidate fact includes at least a first term occurrence;
   receiving the second candidate fact from the second iterator, wherein the second candidate fact includes at least a second term occurrence;
   applying the term occurrence-level constraints to the first and second term occurrences; and
   selecting search results for the input query, based at least in part on applying the term occurrence-level constraints to the term occurrences.

19. The storage medium of claim 18, wherein the instructions for applying the term occurrence-level constraints include instructions for analyzing respective skolem identifiers associated with the first and second term occurrences, and further comprising instructions for performing at least one fact-level operation on at least the first and second candidate facts and for selecting search results for the input query, based at least in part on performing the fact-level operation on the candidate facts.

20. The storage medium of claim 18, wherein the instructions for applying the term occurrence-level constraints include instructions for applying a semantic constraint to the first and second term occurrences, and further comprising instructions for associating respective representations of contexts with the candidate facts, wherein the representations of context as associated with the candidate facts indicate whether the candidate fact is true within that the contexts.

* * * * *